US005744054A

United States Patent [19]

Takei

[11] Patent Number: 5,744,054
[45] Date of Patent: Apr. 28, 1998

[54] HEAT REGENERATING AGENT

[75] Inventor: Masayoshi Takei, Kunitachi, Japan

[73] Assignee: Takei Seisakusho Co., Ltd., Tokyo, Japan

[21] Appl. No.: 779,718

[22] Filed: Jan. 7, 1997

[30] Foreign Application Priority Data

Jan. 20, 1996 [JP] Japan ................................ 8-26078
Oct. 18, 1996 [JP] Japan ............................... 8-297318

[51] Int. Cl.$^6$ ........................................................ C09K 5/00
[52] U.S. Cl. ................................................. 252/70; 252/62
[58] Field of Search ................................ 252/70, 62, 73

[56] References Cited

U.S. PATENT DOCUMENTS

| | | | |
|---|---|---|---|
| 2,916,457 | 12/1959 | Friedrich et al. | 252/75 |
| 4,213,873 | 7/1980 | Church | 106/13 |
| 4,552,686 | 11/1985 | Morris-Sherwood et al. | 252/392 |
| 4,702,916 | 10/1987 | Geria | 424/400 |
| 5,405,602 | 4/1995 | Simmons et al. | 424/47 |

FOREIGN PATENT DOCUMENTS 0 048 429  9/1981  European Pat. Off. .
1 285 862  1/1970  United Kingdom .

OTHER PUBLICATIONS

Japio Abstract No. JP363179801A, which is an abstract of Japanese Patent Application No. 62-011174 (Jul. 1988).
WPIDS Abstract No. 87-287426, which is abstract of Japanese Patent Specification No. 62-199680 (Sep. 1987).
WPIDS Abstract No. 90-372260, which is an abstract of Japanese Patent Specification No. 2-269182 (Nov. 1990).
WPIDS Abstract No. 93-030598, which is an abstract of Japanese Patent Specification No. 4-356582 (Dec. 1992).
WPIDS Abstract No. 93-411083, which is an abstract of Japanese Patent Specification No. 5-311159 (Nov. 1993).

*Primary Examiner*—Anthony Green
*Attorney, Agent, or Firm*—Fish & Richardson P.C.

[57] ABSTRACT

A heat regenerating agent is disclosed, comprising butanediol and polyethylene glycol and if desired, water. The heat regenerating agent according to the present invention is used as a heat insulating agent or a cooling agent, or as a refrigerant or the like.

8 Claims, 4 Drawing Sheets

HEAT REGENERATING AGENT

FIELD OF THE INVENTION

The present invention relates to a heat regenerating agent containing butanediol and polyethylene glycol. The heat regenerating agent according to the present invention is used as a heat insulating agent or a cooling agent, or as a refrigerant or the like.

BACKGROUND OF THE INVENTION

Hitherto, various kinds of heat regenerating agents have been provided. For instance, heat regenerating agents comprising agar-agar and a polyacrylic synthetic polymer having water mixed therewih (see Japanese Patent Publication No. Hei-5-30878), heat regenerating agents containing a vinyl chloride resin gelled upon mixing with a plasticizer and a surface-coated water-containing hydrogel (see Japanese Patent Publication No. Hei-5-45636), and the like are known.

Heat regenerating agents having respective characteristics are obtained from the above-described mixture compositions. However, conventional heat regenerating agents including those as exemplified above take a long period of time for cooling them. Also, almost all of the conventional heat regenerating agents are generally in a gel-like state, and heat regenerating agents which even upon cooling at temperatures considerably lower than 1° C. (e.g., around −35° C. or lower), do not cause icing and freezing have not yet been developed.

SUMMARY OF THE INVENTION

Under the above-described circumstances, the present invention has been made.

An object of the present invention is to provide a heat regenerating agent which can shorten a time period required for cooling it.

In addition to the above-described object, another object of the present invention is to provide a heat regenerating agent which even upon cooling at temperatures considerably lower than 0° C., does not cause icing and freezing but can keep fluidity.

In order to achieve the above-described objects, the present inventor has made extensive and intensive investigations, leading to the accomplishment of the present invention.

BRIEF DESCRIPTION OF THE ACCOMPANYING DRAWINGS

DETAILED DESCRIPTION OF THE INVENTION

Figure 1:
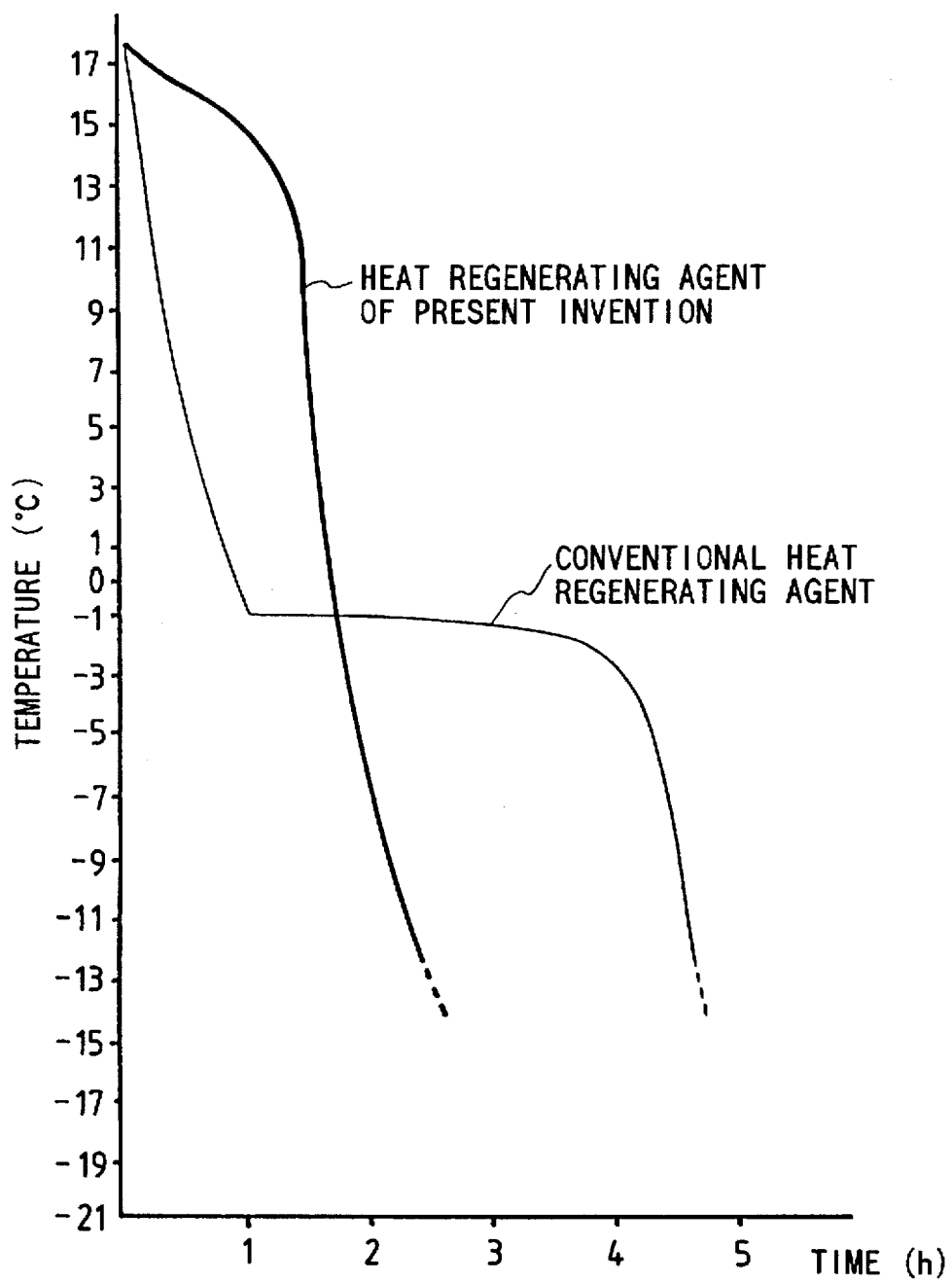
FIG. 1 is a graph to show the heat regenerating effect of a heat regenerating agent in one example of the present invention in comparison with that of a conventional heat regenerating agent.

The present invention is provided as a regenerating agent used for heat insulating agents, cooling agents, and the like. This heat regenerating agent is characterized by containing butanediol and polyethylene glycol.

The appearance of the above-described polyethylene glycol varies depending on the molecular weight, and in general, those having a molecular weight of 1,000 or less are in a liquid-like or viscous state, while those having a molecular weight of 1,000 or more are in a solid-like state (a rigid waxy state, a flake-like state, a flaky powder-like state, etc.). Any of these polyethylene glycols have such a property that they are soluble in water. In the present invention, polyethylene glycols having a molecular weight in the range of from about 190 to 60,000 can be used, and in general, those having a molecular weight in the range of from 200 to 50,000, and preferably from 500 to 30,000 can be enumerated.

On the other hand, examples of the butanediol which is used in the present invention include 1,4-butanediol, 1,2-butanediol, 1,3-butanediol, and 2,3-butanediol, with 1,4-butanediol and 1,2-butanediol being particularly preferred. Any of these butanediols are soluble in water.

The heat regenerating agent of the present invention is prepared by mixing the above-described butanediol and polyethylene glycol. In a specific preparation method, the butanediol and polyethylene glycol in pre-determined amounts are charged in a vessel and stirred and mixed to obtain a heat regenerating agent. In this case, if the above-described preparation is carried out while heating, the mixing and dissolution of the butanediol and polyethylene glycol can be achieved with good efficiency.

While the mixing ratio of the butanediol and polyethylene glycol as active ingredients in the heat regenerating agent according to the present invention is not particularly limited, it is generally proper that the polyethylene glycol is mixed in an amount ranging from about 2 to 15% by weight, and preferably from 2 to 10% by weight, based on the butanediol. If the mixing ratio of the butanediol and polyethylene glycol is out of the above-described range, there may be fears that the heat regenerating time (a capacity time for cooling materials) is shortened or that the heat insulating capacity is unstable.

The characteristics of the butanediol vary depending on the kind of the butanediols as enumerated above. However, when any of these butanediols are mixed with the polyethylene glycol, the resulting mixture composition is not only able to shorten the time required for cooling, as compared with conventional heat regenerating agents but also can be a heat regenerating agent to exhibit an excellent heat regenerating effect. As a result of oral toxicity tests in mice, it has become clear that such heat regenerating agents of the present invention are less toxic, relatively stable, and good for use in cooling agents, heat insulating agents, and the like of foodstuffs and various other materials. In particular, among the above-described heat regenerating agents, since even upon cooling to a temperature as low as −70° C., the composition of 1,2-butanediol having polyethylene glycol mixed therewith does not cause freezing but keeps the liquid state, this heat regenerating agent can be used as cooling agents or heat insulating agents of various materials, and is also proper for use as refrigerants (liquids) used in, e.g., recirculating pipe lines.

The heat regenerating agent according to the present invention is obtained by selecting an arbitrary kind of butanediol from the butanediol as enumerated above and mixing the thus selected single kind of butanediol with polyethylene glycol. However, other preparation methods include a method in which arbitrary plural kinds of butanediols are selected, the thus selected plural kinds of butanediols are compounded with each other, and the compounded butanediols are mixed with polyethylene glycol to obtain a heat regenerating agent. The composition comprising the compounded butanediols as well as the polyethylene glycol can be provided as a heat regenerating agent which is able to apply the characteristics of every kind of butanediol. As the preparation method in the case of compounding plural kinds of butanediols for use, there is also included a method that as described above, the selected butanediol (e.g., 1,4-butanediol) is mixed with polyethylene glycol to form one composition, the selected other butanediol (e.g., 1,2-butanediol) is mixed with polyethylene glycol to form another composition, and the both compositions are then mixed with each other to form a heat regenerating agent.

Also, in addition to the method of mixing butanediol and polyethylene glycol as described above, the heat regenerating agent of the present invention can be obtained by mixing this mixture composition (heat regenerating agent) with a certain amount of tap water, underground water, or other water. The amount of water to be mixed with the above-described composition (heat regenerating agent) varies depending on the kinds or compounding ratio of butanediol and polyethylene glycol used in the foregoing composition. However, the amount of water is generally in the range of from 1 to 99% by weight, and preferably from 5 to 98% by weight, based on the foregoing composition. In this case, if the mixing amount of water is smaller than the above-described range, the mixing of water is substantially meaningless, while if the mixing amount of water exceeds the above-described range, the characteristics of the foregoing composition unfavorably affected. In accordance with the heat regenerating agent having water mixed therewith, not only the production cost is low, but also heat regenerating agents having respective characteristics are obtained depending on the mixing amount of water.

The present invention is hereunder described in more detail with reference to the following Examples. However, these Examples are given only for the illustrative purposes, and as a matter of course, it is not to be construed that the present invention is limited thereto.

EXAMPLE 1

In a water bath having a water temperature kept at 81.5° C. to 82.5° C., 973 g of 1,4-butanediol (a trade name: 14BG, made by Mitsubishi Chemical Corporation) and 27 g of polyethylene glycol (a trade name: Polyethylene Glycol 20000, made by Wako Pure Chemical Industries, Ltd.) were charged in a beaker, and the mixture was thoroughly stirred to obtain a homogeneous composition. This composition was put in a vessel and left for cooling to obtain a turbid heat regenerating agent.

The heat regenerating effect of the thus obtained heat regenerating agent is shown in FIG. 1. The graph of this figure shows the cooling behavior of the above-described heat regenerating agent when it was cooled in a freezing chamber (average temperature in the chamber: −19.7° C.), in comparison with that of a conventional heat regenerating agent.

As is evident from FIG. 1, while the conventional heat regenerating agent requires a longer period of time for passing through an ice crystal-formation region, the heat regenerating agent according to the present invention substantially linearly passes through the ice crystal-formation region and exhibits a superior heat regenerating effect within a shorter period of time.

It has become clear that the heat regenerating agent of Example 1 coagulates at a temperature in the vicinity of 18° C. and then freezes in proportion to the reduction in the temperature. This heat regenerating agent is suitable for use in cooling agents or heat insulating agents of various materials.

EXAMPLE 2

35 g of the composition (heat regenerating agent) as obtained in Example 1 was mixed with 165 g of water to obtain a heat regenerating agent.

EXAMPLE 3

20 g of the composition (heat regenerating agent) as obtained in Example 1 was mixed with 180 g of water to obtain a heat regenerating agent.

EXAMPLE 4

10 g of the composition (heat regenerating agent) as obtained in Example 1 was mixed with 190 g of water to obtain a heat regenerating agent.

The cooling behavior of each of the heat regenerating agents as obtained in Examples 2 to 4 was tested under the same conditions as in Example 1. As a result, it has become clear that these heat regenerating agents can greatly shorten the time required for cooling as compared with the conventional heat regenerating agent. Also, it has become clear that the respective heat regenerating agents of Examples 2 to 4 ice and freeze at −2° C. Likewise the heat regenerating agent of Example 1, these heat regenerating agents of Examples 2 to 4 are suitable for use in cooling agents or heat insulating agents of various materials.

TEST EXAMPLE

Figure 2:
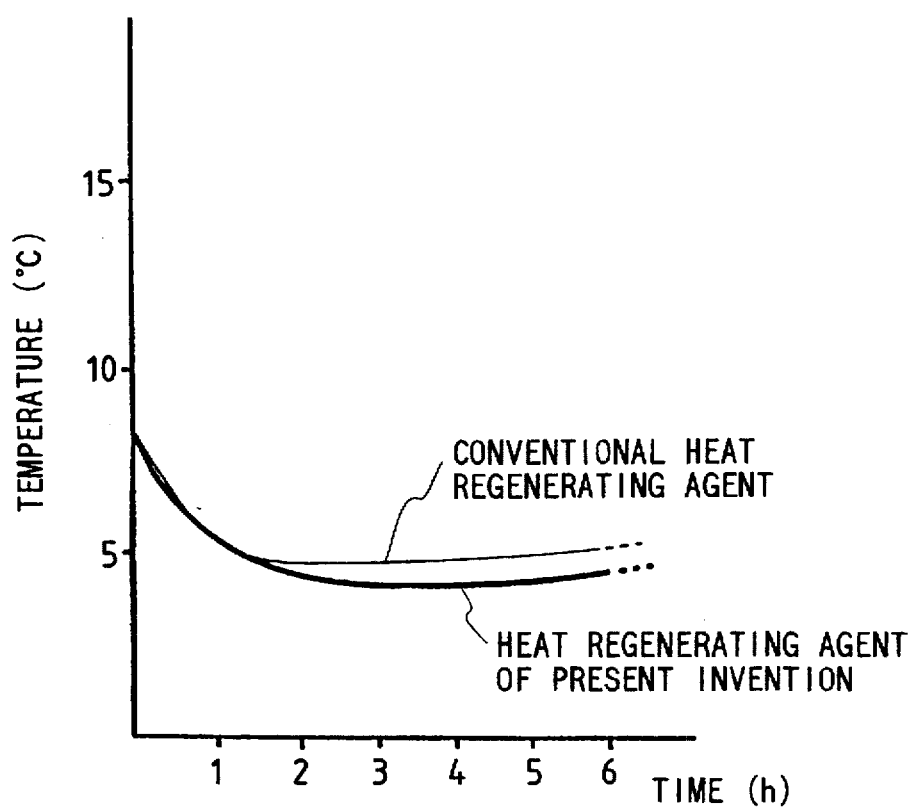
FIG. 2 is a graph to show the heat insulating effect of a heat regenerating agent in other example of the present invention in comparison with that of the conventional heat regenerating agent.

In a closed foamed polystyrene box with a wall thickness of 2 cm (inner dimension: 22 cm B×60 cm L×18 cm D) were placed two 180-ml milk bottles, and sensor portions of an electronic temperature-measuring instrument were inserted in each milk, while the main body of the measuring instrument was set outside of the closed foamed polystyrene box. Two vessels charged with 200 ml of the heat regenerating agent as obtained in Example 4 were separately placed on the side wall surfaces in the above-described closed foamed polystyrene box. FIG. 2 shows the relation between the lapse of time and the temperature of milk. Incidentally, as the conventional heat regenerating agent shown in this figure, the same heat regenerating agent as in FIG. 1 was used, and the results obtained under the same experimental conditions as in the present invention are also shown in FIG. 2 in comparison. It can be readily understood from the graph as shown in FIG. 2 that the heat regenerating agent as obtained in Example 4 is not only long in the heat regenerating duration but also superior in cooling effect. Also, with respect to the heat regenerating agents as obtained in Examples 1 to 3, the results same to those in the heat regenerating agent of Example 4 were obtained.

EXAMPLE 5

In a water bath having a water temperature kept at 81.5° C. to 82.5° C., 970 g of 1,2-butanediol (a trade name: 12BG, made by Mitsubishi Chemical Corporation) and 30 g of polyethylene glycol (a trade name: Polyethylene Glycol 20000, made by Wako Pure Chemical Industries, Ltd.) were charged in a beaker, and the mixture was stirred to obtain a homogeneous composition. This composition was put in a vessel and left for cooling to obtain a turbid heat regenerating agent.

Figure 3:
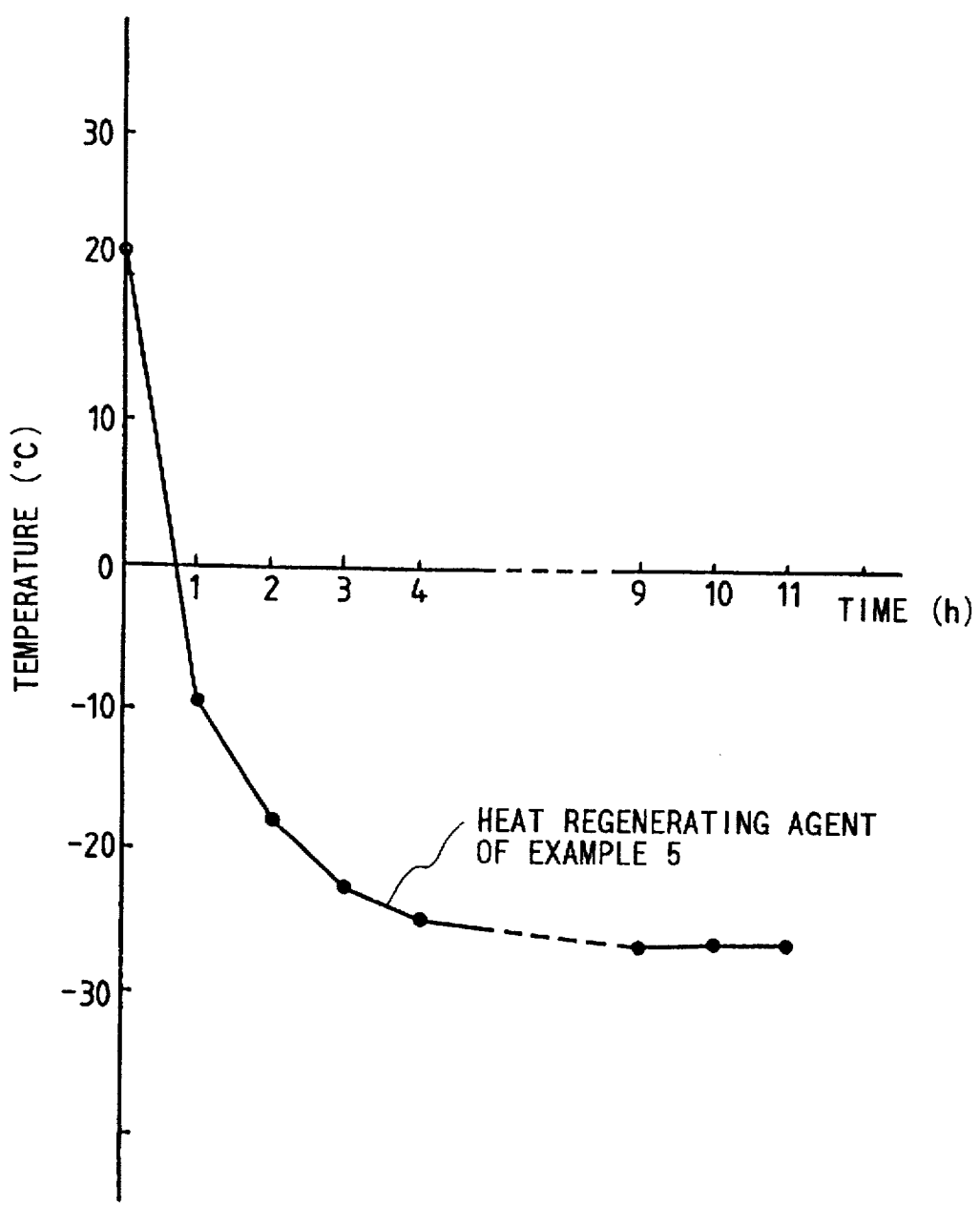
FIG. 3 is a graph to show the heat regenerating effect of a heat regenerating agent in other example of the present invention.
Figure 4:
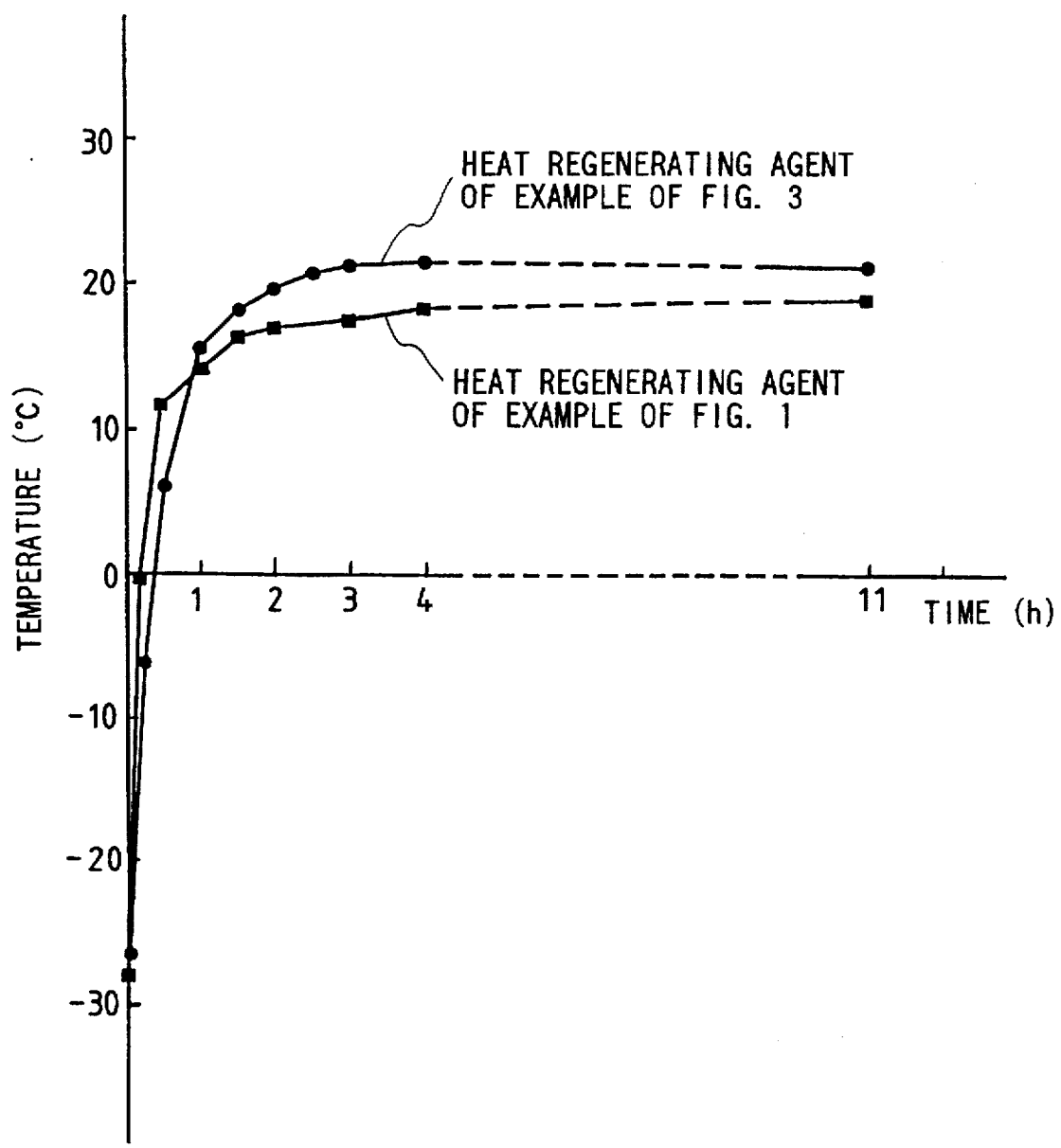
FIG. 4 is a graph to show the heat insulating effect of the heat regenerating agent in the example of FIG. 3 according to the present invention in comparison with that in the example of FIG. 1 according to the present invention.

The heat regenerating effect of the thus obtained heat regenerating agent is shown in FIG. 3 and FIG. 4. The graph as shown in FIG. 3 shows the state of the temperature change (decrease) of the heat regenerating agent according to Example 5 with the lapse of time when it was cooled in a freezing chamber (average temperature in the chamber: −26.6° C.). Further, the graph as shown in FIG. 4 shows the state of the temperature change (increase) of the above-described heat regenerating agent with the lapse of time when it was taken out from the freezing chamber and left for standing in a room (average temperature in the room: 22.9° C.) in comparison with that of the heat regenerating agent as obtained in Example 1.

It can be readily understood from FIG. 3 and FIG. 4 that the heat regenerating agent of Example 5 exhibits a high heat regenerating effect within a short period of time and the time is more shortened with respect to the time required for cooling it as compared with that in the graph as shown in FIG. 1 (as to the heat regenerating agent of Example 1). Incidentally, so far as the heat regenerating duration is concerned, the heat regenerating agent of Example 1 is superior to that of Example 5.

It has become clear that even when the heat regenerating agent of Example 5 is cooled to a temperature as low as −70° C., it does not cause freezing but keeps the liquid state. Accordingly, this heat regenerating agent is not only able to be used as cooling agents or heat insulating agents, but also is proper for use as refrigerants (liquids) used in, e.g., recirculating pipe lines.

EXAMPLE 6

Example 6 is an example of heat regenerating agents prepared by mixing the composition as obtained in Example 5 with water. That is, ten kinds of heat regenerating agents A to J as shown in Table 1 were obtained by mixing 100 g of the composition of Example 5 with water in a ratio ranging from 1:1 to 1:10.

TABLE 1

| Kinds of heat regenerating agent as obtained in Example 6 | Mixing ratio of component (composition to water) |
|---|---|
| A | 1:1 |
| B | 1:2 |
| C | 1:3 |
| D | 1:4 |
| E | 1:5 |
| F | 1:6 |
| G | 1:7 |
| H | 1:8 |
| I | 1:9 |
| J | 1:10 |

The heat regenerating effect of each of the ten kinds of heat regenerating agents A to J as obtained above is set forth in Tables 2 and 3. These Tables 2 and 3 show experimental data as obtained in the Industrial Technology Center of Tokyo, when each of the heat regenerating agents of Example 6 was placed in a freezing chamber (a trade name: PSL-2F, a thermostat manufactured by Tabai Espec K. K.) and cooled (preset temperature in the chamber: −25° C.) to observe the state of the temperature: change (decrease) of the heat regenerating agent with the lapse of time and to examine whether or not the heat regenerating agent causes freezing, as well as when each of the foregoing heat regenerating agents is taken out from the freezing chamber and left for standing in a room to observe the state of the temperature change (increase) of the heat regenerating agent with the lapse of time in comparison.

TABLE 2

| | Temperature change in cooling of heat regenerating agent (°C.) | | | | | |
|---|---|---|---|---|---|---|
| Lapsing time | A | B | C | D | E | Temperature in chamber |
| 0' | 22.9 | 22.7 | 24.6 | 28.3 | 28.2 | 28.7 |
| 1' | 22.7 | 22.5 | 24.4 | 28.1 | 26.3 | 26.3 |
| 15' | 14.4 | 14.6 | 15.4 | 15.9 | 16.5 | 15.0 |
| 22' | 8.0 | 8.9 | 9.0 | 8.9 | 9.8 | 10.0 |
| 27' | 3.4 | 4.4 | 4.5 | 4.2 | 5.4 | 7.5 |
| 1° 26' | −23.5 | −15.8 | −14.0 | −12.7 | −11.6 | −24 |
| 2° 25' | −25.4 | −22.5 | −22.5 | −23.6 | −23.4 | −25 |
| 3° 25' | −24.9 | −25.7 | −25.6 | −25.9 | −25.7 | −25 |
| Freezing test | No | Yes | Yes | Yes | Yes | |

| | Temperature change after standing in room (°C.) | | | | | |
|---|---|---|---|---|---|---|
| Lapsing time | A | B | C. | D | E | Temperature in room |
| 0' | −24.9 | −25.7 | −25.6 | −25.9 | −25.7 | 30 |
| 54' | 16.0 | 9.0 | −4.7 | −4.9 | −3.5 | 30 |
| 1° 54' | 21.5 | 20.0 | 19.3 | 18.9 | 19.4 | 30 |
| 2° 55' | 24.0 | 22.2 | 21.9 | 21.4 | 22.0 | 30 |

TABLE 3

| | Temperature change in cooling of heat regenerating agent (°C.) | | | | | |
|---|---|---|---|---|---|---|
| Lapsing time | F | G | H | I | J | Temperature in chamber |
| 0' | 28.5 | 27.5 | 27.3 | 26.3 | 26.5 | 28.7 |
| 1' | 26.6 | 26.2 | 26.4 | 26.3 | 26.5 | 26.3 |
| 15' | 21.4 | 15.5 | 16.4 | 26.6 | 26.8 | 15.0 |
| 22' | 13.2 | 8.3 | 9.2 | 17.8 | 16.2 | 10.0 |
| 27' | 5.8 | 3.8 | 4.4 | 10.6 | 8.0 | 7.5 |
| 1° 26' | −14.5 | −8.8 | −7.9 | −6.8 | −15.4 | −24 |
| 2° 25' | −24.5 | −24.6 | −24.8 | −25.0 | −26.4 | −25 |
| 3° 25' | −26.0 | −25.8 | −26.4 | −26.3 | −26.6 | −25 |
| Freezing test | Yes | Yes | Yes | Yes | Yes | |

| | Temperature change after standing in room (°C.) | | | | | |
|---|---|---|---|---|---|---|
| Lapsing time | F | G | H | I | J | Temperature in room |
| 0' | −26.0 | −25.8 | −26.4 | −26.3 | −26.6 | 30 |
| 54' | −4.20 | −4.8 | −3.6 | −2.8 | −0.5 | 30 |
| 1° 54' | 19.3 | 5.7 | 5.3 | 8.3 | 18.2 | 30 |
| 2° 55' | 23.1 | 20.0 | 17.7 | 20.5 | 21.9 | 30 |

It can be understood from Tables 2 and 3 that with respect to the heat regenerating agent, while the time in temperature decrease and the time in temperature increase after standing are slow as the mixing ratio of water to the composition increases, any of the heat regenerating agents A to J undergo the cooling within a shorter period of time (the temperature reaches −20° C. or lower 2 hours and 25 minutes after the initiation) and exhibit a superior heat regenerating effect. Also, it has become clear that among the above-described heat regenerating agents, the heat regenerating agents B to J except for the heat regenerating agent A cause freezing at low temperatures of about −25° C. Accordingly, these heat regenerating agents B to J are proper for use as cooling agents or heat insulating agents rather than as recirculating refrigerants.

EXAMPLE 7

Example 7 is another example of heat regenerating agents prepared by mixing the composition as obtained in Example 5 with water. That is, ten kinds of heat regenerating agents K to T as shown in Table 4 were obtained by mixing 100 g of the composition of Example 5 with water in a ratio ranging from 1:1 to 1:1/10.

TABLE 4

| Kinds of heat regenerating agent as obtained in | Mixing ratio of components (composition to water) |
| --- | --- |
| Example 7 | |
| K | 1:1 |
| L | 1:1/2 |
| M | 1:1/3 |
| N | 1:1/4 |
| O | 1:1/5 |
| P | 1:1/6 |
| Q | 1:1/7 |
| R | 1:1/8 |
| S | 1:1/9 |
| T | 1:1/10 |

The heat regenerating effect of each of the ten kinds of heat regenerating agents K to T as obtained above is set forth in Tables 5 and 6. These Tables 5 and 6 show experimental data as obtained in the Industrial Technology Center of Tokyo, when each of the heat regenerating agents of Example 7 was placed in a freezing chamber (a trade name: PSL-2F, a thermostat manufactured by Tabai Espec K. K.) and cooled (preset temperature in the chamber: −70° C.) to observe the state of the temperature change (decrease) of the heat regenerating agent with the lapse of time and to examine whether or not the heat regenerating agent causes freezing, as well as when each of the foregoing heat regenerating agents is taken out from the freezing chamber and left for standing in a room to observe the state of the temperature change (increase) of the heat regenerating agent with the lapse of time in comparison.

TABLE 5

| | Temperature change in cooling of heat regenerating agent (°C.) | | | | | |
| --- | --- | --- | --- | --- | --- | --- |
| Lapsing time | K | L | M | N | O | Temperature in chamber |
| 0' | About 20 | About 20 | About 20 | About 20 | About 20 | 28 |
| 1° 00' | −64.3 | −67.1 | −68.5 | −69.3 | −67.2 | −70 |
| 2° 01' | −70.1 | −70.7 | −70.7 | −70.9 | −70.5 | −70 |
| 4° 07' | −70.9 | −71.0 | −70.8 | −70.9 | −70.5 | −70 |
| 5° 07' | −70.2 | −69.2 | −69.6 | −69.6 | −69.4 | −70 |
| 6° 00' | −70.8 | −70.9 | −70.7 | −70.7 | −70.4 | −72 |
| 7° 03' | −71.0 | −70.9 | −70.7 | −70.7 | −70.3 | −72 |
| Freezing test | Yes | No | No | No | No | |

| | Temperature change after standing in room (°C.) | | | | | |
| --- | --- | --- | --- | --- | --- | --- |
| Lapsing time | K | L | M | N | O | Temperature in room |
| 0' | −71.0 | −70.9 | −70.7 | −70.7 | −70.3 | 30 |
| 1° 05' | 14.4 | 14.6 | 14.8 | 15.3 | 15.7 | 30 |

TABLE 5-continued

| 3° 05' | 23.2 | 22.5 | 22.8 | 22.7 | 23.2 | 29 |
| --- | --- | --- | --- | --- | --- | --- |
| 5° 05' | 24.4 | 23.9 | 24.2 | 24.2 | 24.4 | 28 |
| 7° 05' | 25.3 | 24.6 | 25.0 | 24.8 | 25.1 | 28 |
| 9° 05' | 25.7 | 25.2 | 25.6 | 25.3 | 25.7 | 28 |
| 11° 05' | 25.8 | 25.4 | 25.7 | 25.6 | 25.9 | 28 |
| 13° 05' | 25.8 | 25.4 | 25.8 | 25.6 | 26.0 | 27 |
| 15° 05' | 25.9 | 25.6 | 25.8 | 25.6 | 26.0 | 27 |
| 16° 35' | 26.2 | 25.9 | 26.2 | 26.0 | 26.4 | 27 |

TABLE 6

| | Temperature change in cooling of heat regenerating agent (°C.) | | | | | |
| --- | --- | --- | --- | --- | --- | --- |
| Lapsing time | P | Q | R | S | T | Temperature in chamber |
| 0' | About 20 | About 20 | About 20 | About 20 | About 20 | 28 |
| 1° 00' | −66.6 | −68.0 | −69.4 | −68.9 | −68.5 | −70 |
| 2° 01' | −70.8 | −70.6 | −70.9 | −70.8 | −71.0 | −70 |
| 4° 07' | −70.7 | −70.6 | −71.0 | −70.9 | −71.1 | −70 |
| 5° 07' | −70.0 | −69.6 | −69.5 | −70.0 | −69.9 | −70 |
| 6° 00' | −70.6 | −70.4 | −70.8 | −70.8 | −71.1 | −72 |
| 7° 03' | −70.6 | −70.4 | −70.8 | −70.8 | −71.2 | −72 |
| Freezing test | No | No | No | No | No | |

| | Temperature change after standing in room (°C.) | | | | | |
| --- | --- | --- | --- | --- | --- | --- |
| Lapsing time | P | Q | R | S | T | Temperature in room |
| 0' | −70.6 | −70.4 | −70.8 | −70.8 | −71.2 | 30 |
| 1° 05' | 13.1 | 12.8 | 14.2 | 14.7 | 18.7 | 30 |
| 3° 05' | 22.2 | 22.2 | 22.1 | 23.0 | 24.3 | 29 |
| 5° 05' | 24.0 | 23.9 | 23.7 | 24.6 | 25.3 | 28 |
| 7° 05' | 24.9 | 24.8 | 24.6 | 25.4 | 25.7 | 28 |
| 9° 05' | 25.4 | 25.4 | 25.4 | 26.0 | 26.0 | 28 |
| 11° 05' | 25.7 | 25.8 | 25.7 | 26.1 | 26.0 | 28 |
| 13° 05' | 25.8 | 26.0 | 25.8 | 26.1 | 26.0 | 27 |
| 15° 05' | 25.8 | 26.2 | 26.0 | 26.1 | 26.1 | 27 |
| 16° 35' | 26.2 | 26.6 | 26.3 | 26.6 | 26.4 | 27 |

It can be readily understood from Tables 5 and 6 that with respect to the heat regenerating agent, while the time in temperature decrease and the time in temperature increase after standing are fast as the mixing ratio of water to the composition decreases, any of the heat regenerating agents K to T undergo the cooling within a short period of time (the temperature reaches −60° C. or lower 1 hour after the initiation) and exhibit a superior heat regenerating effect. Also, it has become clear that among the above-described heat regenerating agents, the heat regenerating agent K causes freezing at low temperatures of about −60° C., whereas even upon cooling to a temperatures as low as −70° C., the heat regenerating agents L to T do not cause freezing but keep the liquid state. Accordingly, these heat regenerating agents K to T are not only applicable as cooling agents or heat insulating agents but also proper for use as refrigerants (liquids) used in, e.g., recirculating pipe lines. Incidentally, while the composition as obtained in Example 5 is a turbid liquid, if this composition is mixed with water in an amount of about 10% by weight (inner percentage) or more, it becomes a colorless transparent liquid.

EXAMPLE 8

In a water bath having a water temperature kept at 81.5° C. to 82.5° C., 485 g of 1,4-butanediol (the same commercial product as in Example 1), 485 g of 1,2-butanediol (the same commercial product as in Example 5), and 30 g of polyethylene glycol (the same commercial product as in Example 1) were charged in a beaker, and the mixture was stirred to obtain a homogeneous composition. This composition was put in a vessel and left for cooling to obtain a turbid heat regenerating agent.

The thus obtained heat regenerating agent is a heat regenerating agent possessing both the characteristics of 1,4-butanediol and those of 1,2-butanediol and is suitable for use in cooling agents or heat insulating agents.

EXAMPLE 9

Heat regenerating agents were prepared by mixing the composition as obtained in Example 8 with water in the same amounts as in Examples 6 and 7. Likewise the heat regenerating agent of Example 8, each of these heat regenerating agents exhibits a superior heat regenerating effect owing to the synergistic effect from the characteristics of each of 1,4-butanediol and 1,2-butanediol and mixing of these with water and is proper for use in cooling agents or heat insulating agents of various materials.

The heat regenerating agent according to the present invention not only exhibits a superior heat regenerating agent within a short period of time but also is superior in the heat insulating effect.

While the invention has been described in detail and with reference to specific embodiments thereof, it will be apparent to one skilled in the art that various changes and modifications can be made therein without departing from the spirit and scope thereof.

What is claimed is:

1. A heat regenerating agent comprising a mixture of 90–98% by weight butanediol and 2–10% by weight polyethylene glycol.

2. A heat regenerating agent as claimed in claim 1 further comprising 1–99% by weight water, wherein said mixture is the sole non-aqueous component of the heat regenerating agent.

3. A heat regenerating agent as claimed in claim 1, wherein said butanediol is 1,4-butanediol, 1,2-butanediol, or a mixture thereof.

4. A heat regenerating agent as claimed in claim 2, wherein said butanediol is 1,4-butanediol, 1,2-butanediol, or a mixture thereof.

5. A heat regenerating agent as claimed in claim 1, wherein said polyethylene glycol has a molecular weight in the range of from 190 to 60,000.

6. A heat regenerating agent as claimed in claim 2, wherein said polyethylene glycol has a molecular weight in the range of from 190 to 60,000.

7. A heat regenerating agent as claimed in claim 3, wherein said polyethylene glycol has a molecular weight in the range of from 190 to 60,000.

8. A heat regenerating agent as claimed in claim 4, wherein said polyethylene glycol has a molecular weight in the range of from 190 to 60,000.

* * * * *